M. MULLINS.
EDUCATIONAL DEVICE.
APPLICATION FILED MAY 16, 1911.
1,023,586.
Patented Apr. 16, 1912.
2 SHEETS—SHEET 1.
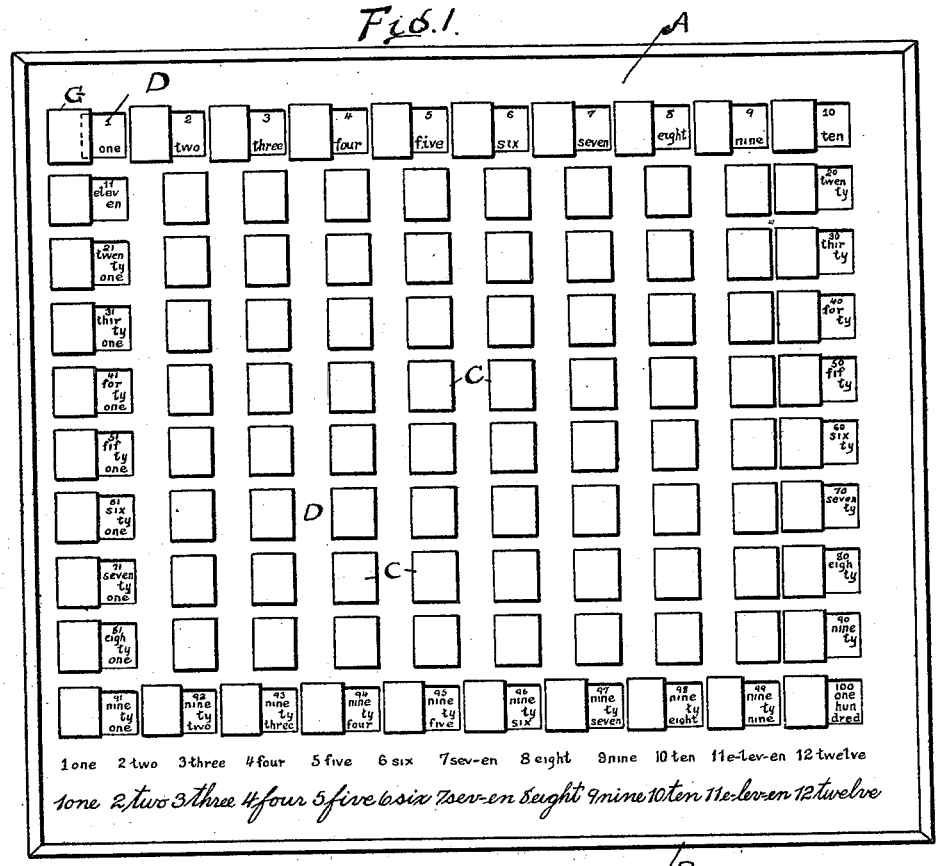
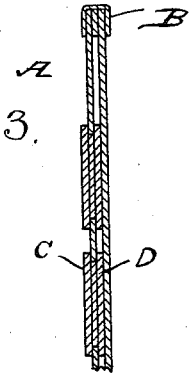
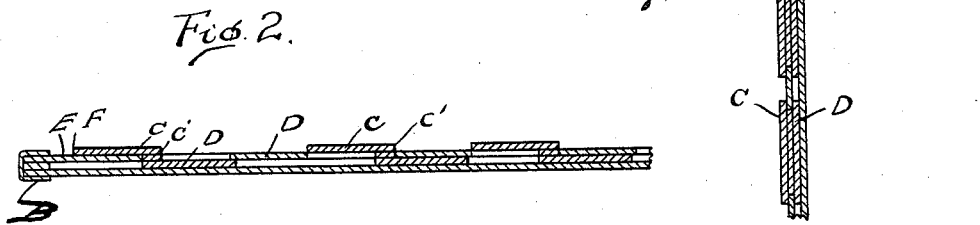

M. MULLINS.
EDUCATIONAL DEVICE.
APPLICATION FILED MAY 16, 1911.
1,023,586.
Patented Apr. 16, 1912.
2 SHEETS—SHEET 2.
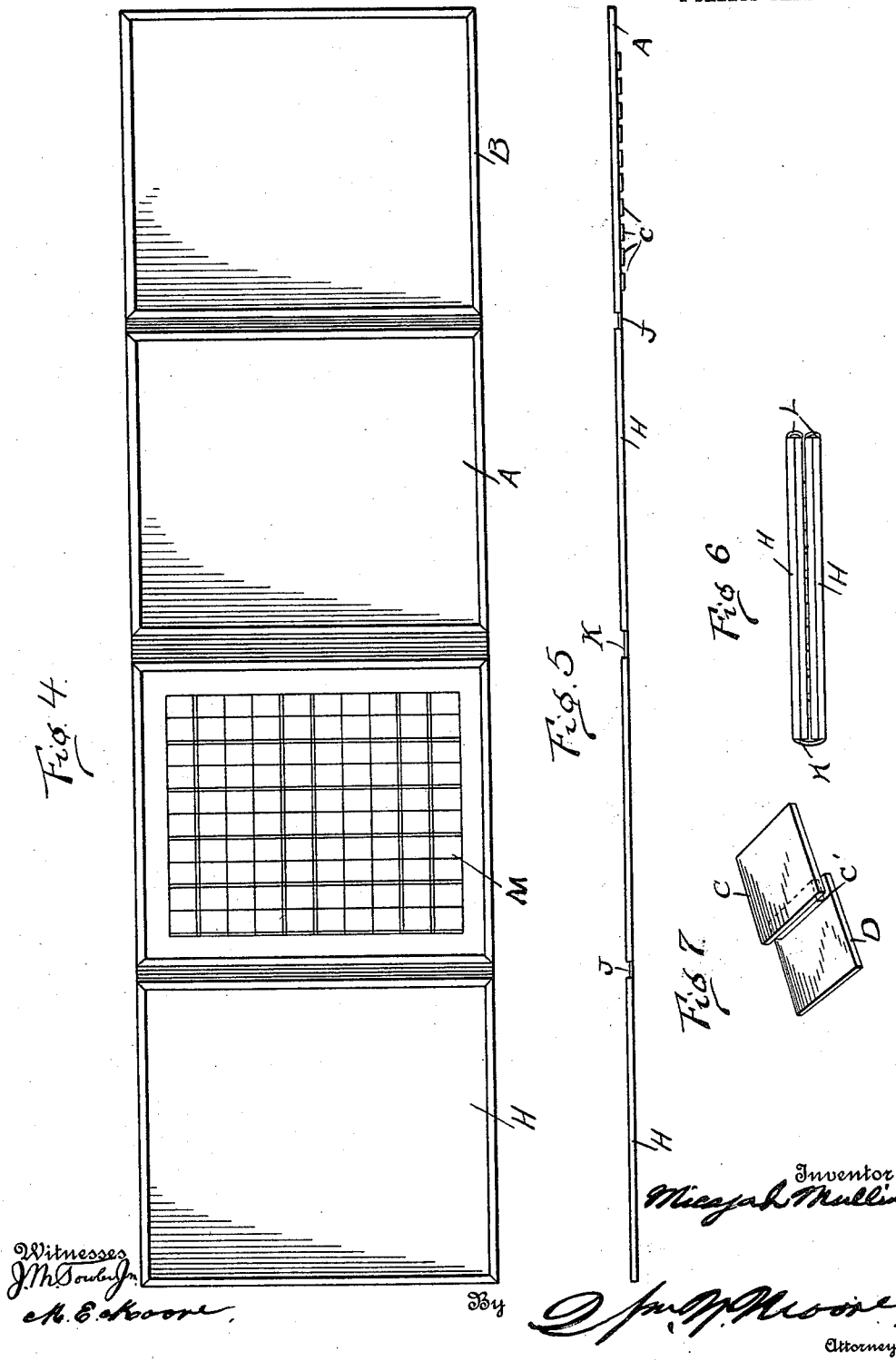

UNITED STATES PATENT OFFICE.

MICAJAH MULLINS, OF JUNCTION CITY, KANSAS.

EDUCATIONAL DEVICE.

1,023,586. Specification of Letters Patent. Patented Apr. 16, 1912.

Application filed May 16, 1911. Serial No. 627,606.

*To all whom it may concern:*

Be it known that I, MICAJAH MULLINS, a citizen of the United States, residing at Junction City, in the county of Geary and State of Kansas, have invented certain new and useful Improvements in Educational Devices, of which the following is a specification.

My invention relates to improvements in educational devices and more particularly to a device for teaching children in the lower grades to count easily and accurately by objective analysis, that is by impressing upon their mind the orderly association of numbers and objects in connection with sight, sound and use. Among children of the lower grades whose minds are at the impressionable stage and whose faculties are developing quickly and surely, care should be taken in their instruction, and proper allowance made for their natural pride in discovering certain existing truths for themselves. This analysis has for an object the fostering and developing of this universal axiom among educators, and aims particularly to so direct and guide the young scholar that he will learn to confidently rely upon his own individual ability to think for himself, besides presenting the subject in such a clear, lucid and attractive and interesting manner that instead of the usual drudgery and mental torture generally associated with the acquisition of the multiplication table and fractions, the work will become a pleasure and a delight and will stimulate and foster class rivalry, affording as it does unlimited opportunities for the pupil's own advancement and progress without the aid of a mentor or instructor.

Another object of my invention is the provision of a device of the character named which will set forth clearly and attractively the numbers singly and in groups, arranged in color schemes and associated with sight, sound and use, thus making a more lasting impression on the mind of the young scholar than is done at present under the old regime.

Another object of my invention is the provision of a device of the abovenamed character, which will save a vast amount of time in the instruction of the pupil, owing to the fact that he can see the different units of measure and the divisions and sub-divisions of each in association with the words of its individual table.

Other objects of my invention are to provide a device for use in the lower grades, which will aid the pupil to master by himself and largely through his own efforts, the fundamental principles of counting and enumeration, addition, subtraction, multiplication and division; which will train the mind to concentrate its thought by suggestive association; which will make the work of both teacher and pupil attractive and interesting; and which will encourage and stimulate ambition and further desire for knowledge.

To attain the desired objects my invention resides in the provision of a device of the character named, which will be of simple and inexpensive construction and thoroughly practical and efficient from every view point, and in the accompanying drawings I have illustrated a practical embodiment of my invention.

Figure 1 represents a face view of my device, showing the bounding rows of the blocks or sliding members moved out of position to uncover and reveal the printed numeral and word descriptive thereof beneath. Fig. 2 represents a horizontal sectional view through one side of the counting and grouping board. Fig. 3 represents a vertical sectional view through one side of the counting board. Fig. 4 represents a top plan view of the board and back uniting to form the complete folder, and having the chart thereon. Fig. 5 represents a horizontal sectional view of the entire folder, the board and outside back folding in when not in use. Fig. 6 represents a side sectional view of the entire folder in folded position, showing the compact position it assumes when folded. Fig. 7 represents a detail view of one of the blocks or sliding members.

In the drawings in which similar characters of reference denote corresponding parts in all the views: The letter A designates the counting or grouping board B, the edge or rim of the said board, C, the sliding blocks mounted as at C' on the strip of cardboard or celluloid D, which contains the printed numeral and word descriptive of said numeral, and the strip slides under the surface E of the board and the edges G of the blocks C slide along the grooves F on the surface of the said board A.

It will be understood that when the blocks C are moved to the side, as shown in Fig.

1, the strips D, containing the printed number and word and upon which the blocks are mounted, are moved out from beneath the surface of the board and into view, and assume the position formerly occupied by the said blocks C.

From this construction it will be seen that when the teacher or instructer wishes to show the particular form of a certain numeral, the numeral 1 for instance, she moves the disk or block C to the left, causing the strip D to assume the position just vacated by the said block, and exposing the printed number "1" above the printed word "one," said word and number being printed on the strip as hereinbefore explained. Since the numbers run in regular order from 1 to 10 in the first row, 11 to 20 in the second, and so on it will be seen that a practical knowledge of the Arabic numerals up to 100 is soon acquired as well as the form, appearance and spelling and pronunciation of each character. Concerning the method of instruction for numerals over 100 more will be said later. It will also be noted that at the bottom of Fig. 1 are placed numbers and their corresponding spelling, the spelling being syllabified in order to aid the pronunciation and better impress the derivation and formation of the word, said numbers and spelling appearing in script as well as printed form, thus enabling the scholar to become familiar with both forms of the words and figures.

The letter H designates the cover of my device, J the connecting strips, K the binding at one end for the entire folder, and L the binder at the other end for each group containing the two sections folded together, all of which being of common construction.

To add on multiples it will be seen that any number can be used, for instance, group the first 10 into 2's, beginning on the second block, and as the blocks are moved name the unit figures, 2, 4, 6, 8, 0 (calling 0 ten as it shows the end of some 10 in each row). Continue to objectify 2's on to 100, calling only the first tens figure of the same name in each row and carry it in mind until the next tens figure is reached.

To subtract on multiples, begin at 100 and reverse the method of addition, calling 100, 98, 6, 4, 2, 90; 88, 6, 4, 2, 80, and so on.

To multiply objectify the 2's as in addition up to 10 times 2; and then call 2 is 2, two 2's are 4, and so on.

To divide objectify the 2's as in addition up to ten 2's, saying 2 is one 2, 4 is two 2's, and so on up to 20. After 20 has been learned thoroughly objectify beginning on the odd number 1, and continue as in the previous steps.

It is apparent that by designating each block as a cent, marble or some other familiar object, interest will be added to the lessons, and moreover a good foundation is laid regarding the basic value of our currency.

It will be understood that odd numbers on the objective and analytic counting and grouping board are designated by red blocks and the even numbers are indicated by blue blocks, variations in the shade of red and blue being made to add to the color scheme and make the whole board stand out more plainly in the mind of the scholar, the fundamental principle being a color for odd numbers and a color for even numbers.

On the inner side of the board is placed the objective and analytical counting table or chart M for numerals above 100 and up to 1000, the color scheme being followed out with the additions that the green represents the tens, the blacks the hundreds, and so on until 1000 is reached, whereupon the numbers while retaining their colors are increased by the addition of another figure, in this case the figure 1, which, since it is an odd number is designated by the red numeral 1, followed by the black numeral 0, representing hundreds, the green numeral 0, representing tens, and the blue numeral 0, representing even units. As this system can be continued indefinitely, and since it affords a very desirable means for impressing the mind of the pupil with the value of a certain numeral, that is its unitary value, I have adopted it and inculcated it in my device, it however being understood, that I do not limit myself to any particular color for a certain unit, as the colors and numbers of reference herein used are merely by way of illustration and are not essential to the use of my device. I also place the printed form of the unit either at the side of or over the character which it designates in the same color of the character, and in this way the objectifying by sight and color is made all the clearer in the mind of the scholar, thus tending to aid the mental process of recalling the value of a certain number, by thinking of its color and position. Continuing the color scheme still further I avail myself of the device of separating the groups of tens horizontally by green lines, and perpendicularly dividing each ten to one hundred into pairs by red and blue lines. Each ten to one hundred is also divided perpendicularly into groups of 4's, marked by double blue lines placed to the right of the 4's and 8's, and also by double red lines placed to the right of the 1's, 5's, and 9's, thereby marking the 4's in each ten beginning on the odd number 1.

From the foregoing description taken in connection with the drawings it will be seen that I have provided a device which will lessen the time and labor to be spent on the principles of enumeration; which places the numbers and their corresponding colors before the pupil in such an attractive, clear and concise manner that he cannot fail to understand and become interested; thereby creating a spirit of ambition and thoroughness, besides inculcating a desire to learn for himself; and finally an appliance of this character which will be so inexpensive of production as to warrant its adoption in households as well as public schools and kindergartens.

I claim:

1. In a device of the character named, the combination with the covers and back, of a counting and grouping board having colored sliding blocks or disks, strips sliding beneath the surface of the board and bearing said blocks thereon, and printed matter of various colors on said strips adapted to be exposed to view upon the movement of the blocks.

2. In a device of the character named, the combination with the covers and back, of a counting and grouping board having colored sliding blocks or disks, said blocks or disks being mounted on strips adapted to slide under the surface of the said board, and printed matter of various colors on said strips and adapted to be exposed to view upon the movement of said blocks.

3. In combination with the back and covers, of a grooved board having blocks of various colors mounted thereon, said blocks being slightly larger than the aperture over which they are mounted to form edges to engage with the grooves, strips whereupon said blocks are mounted having figures and words printed thereon, and adapted to slide forward with the movement of the block and be exposed to view.

4. In combination with the covers and backs, of a counting and grouping board having strips sliding beneath the surface thereof, printed matter on said strips, said printed matter being of various colors, blocks mounted on the strips, said blocks being of different colors and being adapted to slide sidewise to expose the printed matter on the strips, and figures and words of different colors at the bottom of the board, said figures and words being written in script as well as printed.

5. In combination with the covers and back, of a counting and grouping board, blocks mounted on strips thereon, said blocks and strips being adapted to slide along the board, numbers and words at the bottom of the said board, the other side of said board having charts thereon, comprising various numerals in regular order and color arrangement, said charts having single and double lines in various colors thereon to indicate different and various divisions of said figures on the charts.

In testimony whereof I affix my signature in presence of two witnesses.

MICAJAH MULLINS.

Witnesses:
  JOHN N. TRITLE,
  J. E. CLEMOSON.

Copies of this patent may be obtained for five cents each, by addressing the "Commissioner of Patents, Washington, D. C."